US012616985B1

(12) United States Patent
Clutter

(10) Patent No.: US 12,616,985 B1
(45) Date of Patent: May 5, 2026

(54) BACK-CARRIED PAINT SPRAYER

(71) Applicant: Mike Clutter, Lake Worth, FL (US)

(72) Inventor: Mike Clutter, Lake Worth, FL (US)

( * ) Notice: Subject to any disclaimer, the term of this patent is extended or adjusted under 35 U.S.C. 154(b) by 242 days.

(21) Appl. No.: 18/130,785

(22) Filed: Apr. 4, 2023

(51) Int. Cl.
*B05B 9/08* (2006.01)

(52) U.S. Cl.
CPC .......... *B05B 9/0888* (2013.01); *B05B 9/0861* (2013.01)

(58) Field of Classification Search
CPC .. B05B 9/0888; B05B 9/0861; A01M 7/0017; A01M 7/0046
See application file for complete search history.

(56) References Cited

U.S. PATENT DOCUMENTS 4,651,903 A * 3/1987 Pagliai .................. B05B 9/0888 239/153
5,248,089 A * 9/1993 Bekius ...................... B05B 9/08 239/154
5,636,791 A * 6/1997 Leer ...................... B05B 9/0877 239/153
5,752,661 A * 5/1998 Lewis ................... B05B 9/0888 239/153
5,829,874 A * 11/1998 Breeding ................ E04G 21/08 224/265
6,651,853 B2 * 11/2003 Higgins .................... A45F 4/02 224/652
7,703,645 B2 * 4/2010 Moskun .................... A45F 3/08 224/579
7,854,396 B2 * 12/2010 Wu ....................... B05B 9/0877 239/152
9,038,922 B1 * 5/2015 McLeod ................... B05B 1/28 239/11
9,358,563 B2 * 6/2016 Kennemer ............ B05B 9/0877
10,342,319 B1 * 7/2019 Alabdulkarim ........... A45F 3/08
10,639,659 B1 * 5/2020 Gutekunst ............. F04B 23/025
10,994,294 B2 * 5/2021 Fontaine ................. F04B 17/06
11,089,859 B2 * 8/2021 Nordmann ................ A45F 3/08
11,446,691 B2 * 9/2022 Wieser .................. B05B 9/0805
2005/0279293 A1 * 12/2005 Vaughan ................. B05B 9/085 122/36
2007/0207042 A1 * 9/2007 Hahn ...................... B08B 3/026 417/364
2016/0256880 A1 * 9/2016 Linton ................ B05B 12/1418
2018/0104710 A1 * 4/2018 Cabral ................ A01M 7/0017
2019/0125908 A1 * 5/2019 Swartz ...................... A61L 2/18
2019/0388918 A1 * 12/2019 Gustafson ............. B05B 9/0861

(Continued)

*Primary Examiner* — Joseph A Greenlund
(74) *Attorney, Agent, or Firm* — Sanchelima & Associates, P.A.; Christian Sanchelima; Jesus Sanchelima

(57) ABSTRACT

A back-carried paint sprayer including a sprayer assembly and a harness assembly. The sprayer assembly includes a container that stores a colored substance in liquid state, wherein said colored substance is moved by means of a motorized pump powered by a rechargeable battery housed in a bottom side of the container. The motorized pump is actuated by means of a spray gun that includes extension wands to reach high, low, and recessed areas when painting. The colored substance that is moved by the motorized pump that flows through a hose connected to the spray gun is regulated by means of a prime valve as the user may consider appropriate. The sprayer assembly is attached to the dorsal of a safety harness by means of a support assembly, allowing the user to be secured and preventing the user from falling when painting in dangerous places.

8 Claims, 4 Drawing Sheets

(56) References Cited

U.S. PATENT DOCUMENTS

| | | | | |
|---|---|---|---|---|
| 2021/0046494 | A1* | 2/2021 | Lam | B05B 9/0888 |
| 2021/0078026 | A1* | 3/2021 | Suardika | B05B 11/0056 |
| 2021/0276029 | A1* | 9/2021 | Wieser | B05B 9/0805 |
| 2023/0060706 | A1* | 3/2023 | Waldon | B05B 15/63 |
| 2023/0390794 | A1* | 12/2023 | Bauer | B05B 12/08 |
| 2024/0001384 | A1* | 1/2024 | Li | F04B 49/06 |

* cited by examiner

BACK-CARRIED PAINT SPRAYER

BACKGROUND OF THE INVENTION

1. Field of the Invention

The present invention relates to a paint sprayer and, more particularly, to a back-carried paint sprayer that includes a safety harness with a backpack paint sprayer attached to the rear side thereof, wherein the paint sprayer has a motorized pump powered by a rechargeable battery.

2. Description of the Related Art

Several designs for back-carried paint sprayers have been designed in the past. None of them, however, include a paint sprayer container attached to the rear side of a safety harness, wherein the paint sprayer container includes a spray gun with detachable extension wands and a motorized pump powered by means of a rechargeable battery allowing the paint sprayer device to be portable.

Applicant believes that a related reference corresponds to U.S. Pat. No. 5,248,089 issued for combination carrying case/paint container. Applicant believes that another related reference corresponds to U.S. Pat. No. 4,651,903 issued for motorized pump pressurized liquid sprayer. None of these references, however, teach of a back-carried tank with a motorized pump that supplies paint to a spray gun device, wherein the tank apparatus includes a shoulder harness and extension wands that are stored in a receptacle integrally formed on one side of the tank.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable paint sprayer device that is rechargeable by means of a battery.

It is another object of this invention to provide a safety device when painting inaccessible areas.

It is still another object of the present invention to provide a device with regulable pressure and extension wands for the spray gun.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
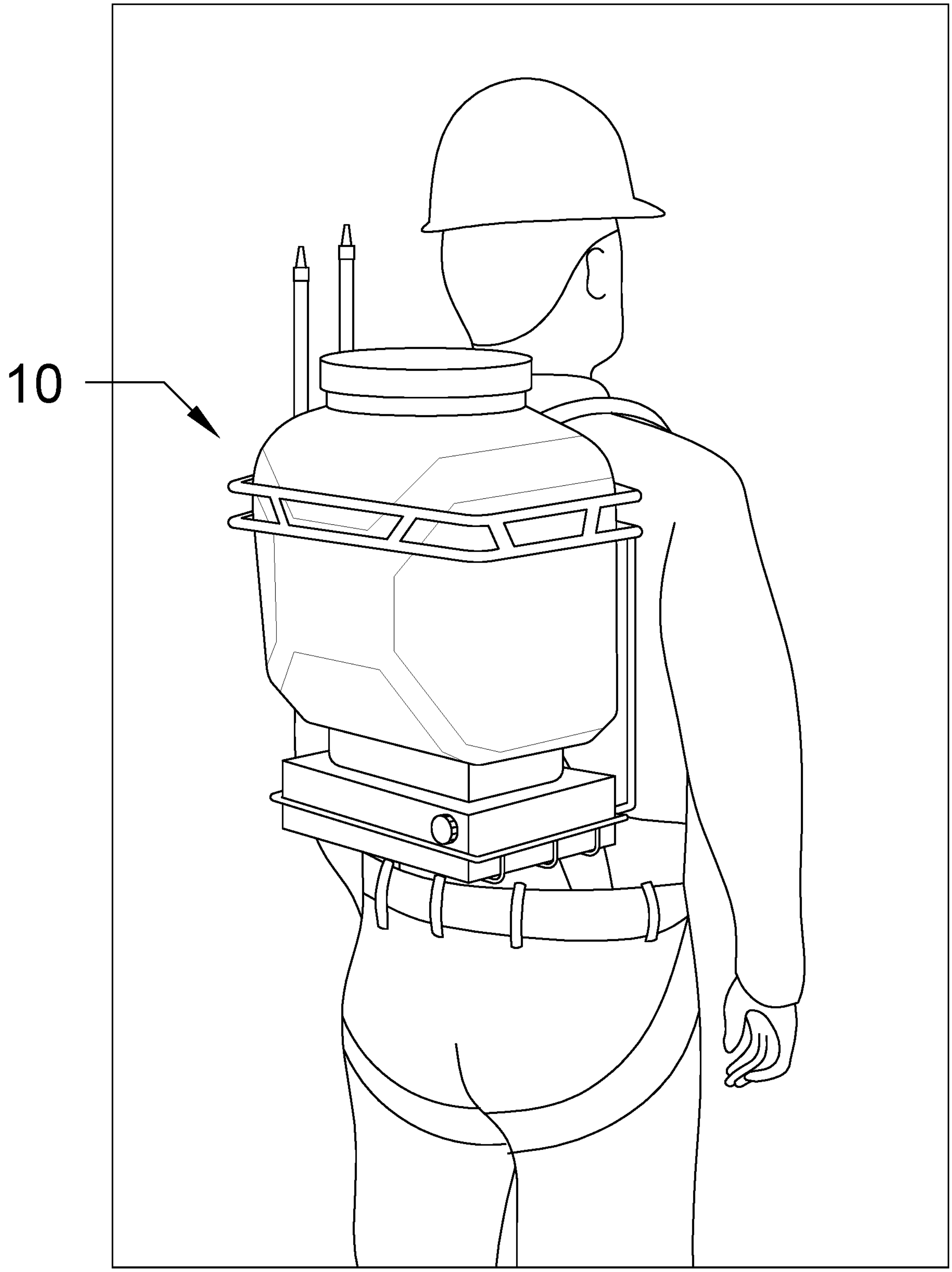
FIG. 1 represents an operational view of an exemplary embodiment of the present invention 10, wherein the sprayer assembly 20 is attached at the dorsal of the harness assembly 40 to be carried by the user.

Referring now to the drawings, where the present invention is generally referred to with numeral 10, it can be observed that it basically includes a sprayer assembly 20 and a harness assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
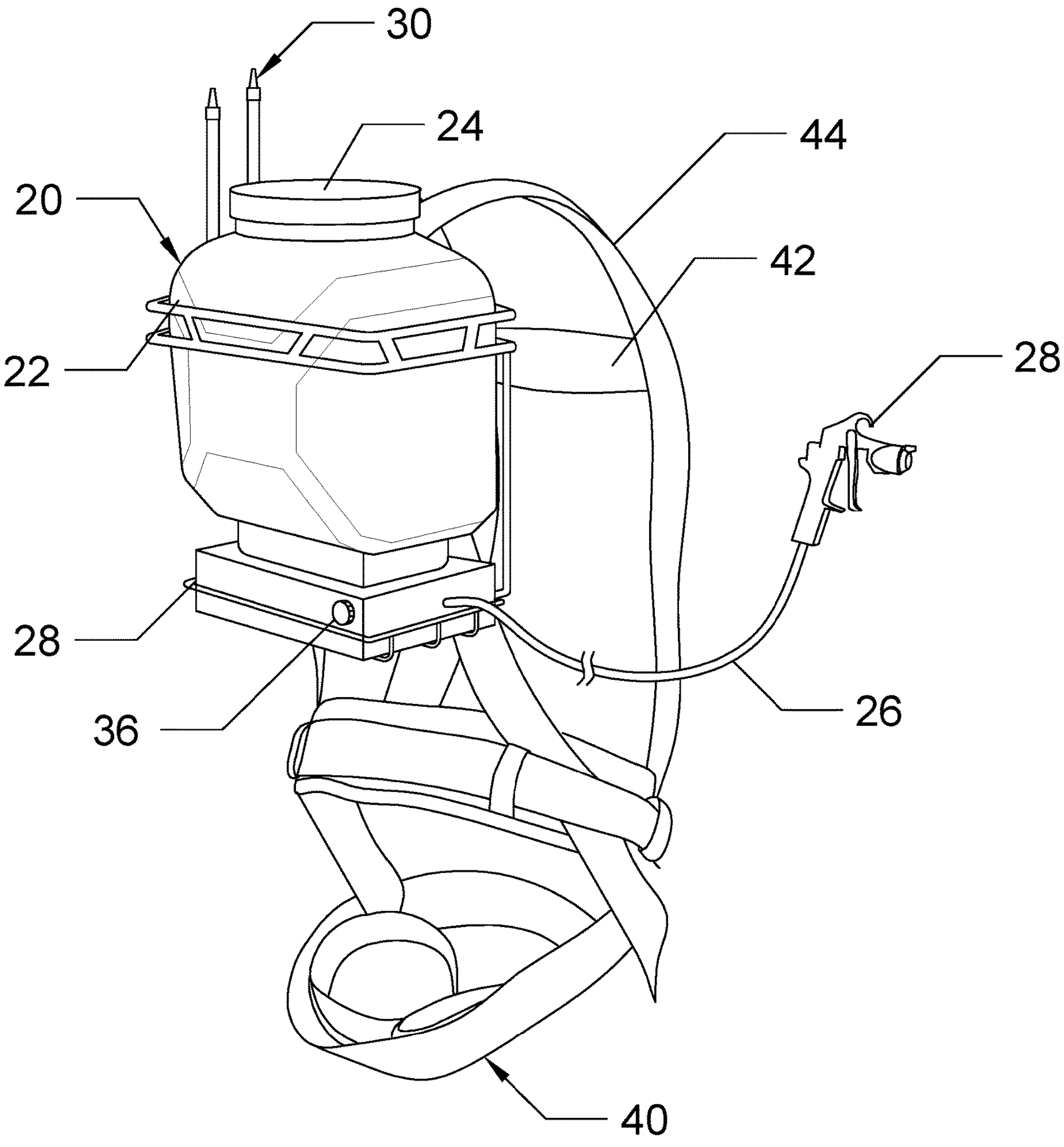
FIG. 2 shows an isometric view of the present invention 10, wherein the spray gun 28 may be actuated by means of a trigger where the outlet pressure of the paint contained into the container 22 is regulable by means of the prime valve 36 coupled to the housing 38.

Sprayer assembly 20 includes a container 22, a lid 24, a hose 26, a spray gun 28, extension wands 30, a motorized pump 32, a battery 34, a prime valve 36, and a housing 38. In an exemplary embodiment, the container 22 may be a box-shaped receptacle adapted to store a colored substance in a liquid phase, wherein the container 22 may include an opening in a top side thereof where the lid 24 may be removable attachable to cover and protect the colored substance. As FIG. 2 depicts. Nonetheless, it should be considered that the opening of the container 22 may be placed on a top periphery of the container 22 wherein a slanted opening may be suitable to add the colored substance. In a suitable embodiment, the container 22 may be made of a plastic material, a metal material or any other suitable material that protects the interior thereof from the ambiance.

Figure 4:
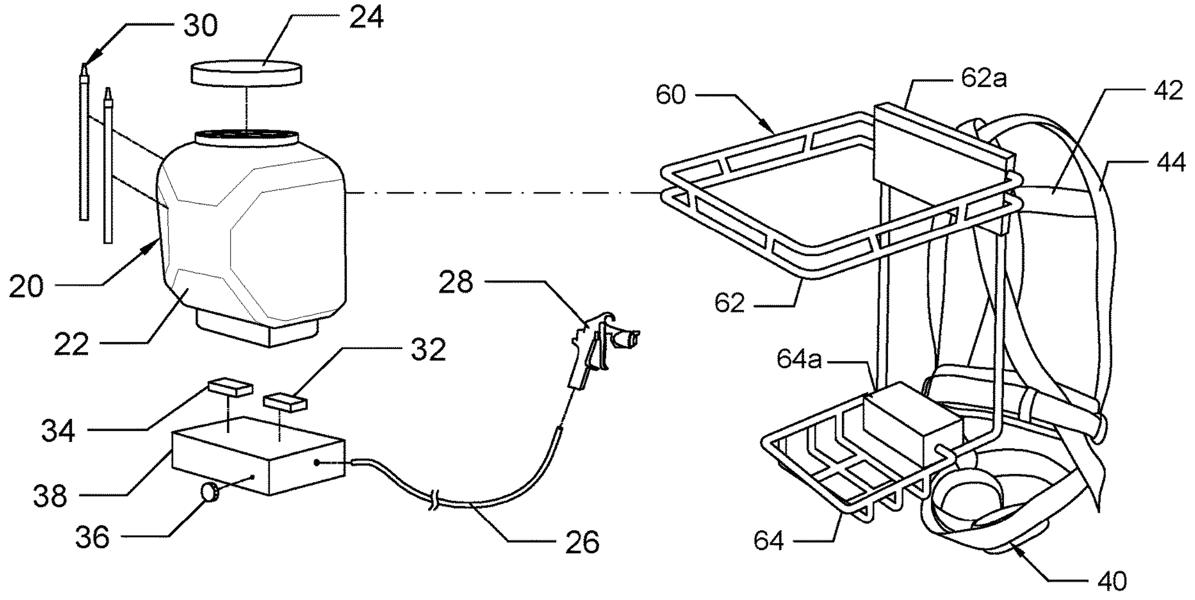
FIG. 4 is a representation of an exploded view of the present invention 10, wherein the motorized pump 32 and the battery 34 are housed inside the housing 38 allowing the present invention to be portable and carried by means of the support assembly 60.

Referring to FIG. 4, the lid 24 may have a suitable circumference to fit around the opening of the container, wherein the lid 24 may be threadedly attached to the opening, nevertheless, the lid 24 may be placed on the opening of the container 22 by pressing the lid 24 against the opening, thereby creating a sealed closing. It should be considered that the opening may have a filter made of mesh that allows the colored substance to be filtered and prevent debris from entering the container 22, wherein said filter may be removably attachable from said opening. In a preferred embodiment, the container 22 further includes a bottom opening in a bottom edge thereof where the motorized pump 32 may be connected. It should be considered that the motorized pump 32 may be an airless pump, wherein the airless pump may use a piston to draw the liquid substance out from the container 22 and into the motorized pump 32. The motorized pump 32 includes a chamber which is sealed by a diaphragm or any other suitable seal, when the motorized pump is actuated the piston compressed the seal, forcing the liquid substance out from the motorized pump 32 through the hose 26 and sprayer gun 28 thereby the airless pump operatively connected and driven by the motor of the motorized pump 32, said chamber is connected to said container by means of e bottom opening thereof, thus the liquid substance may be atomized when the spray gun 28 is actuated and where the flow and/or pressure of the liquid substance may be regulated by means of the prime valve 36. In one embodiment, the spray gun 28 is an equipment that can spray the colored substance in liquid phase using the pressure generated by the motorized pump 32 to apply said colored substance on a surface, wherein the spray gun is connected to the motorized pump 32 by means of the hose 26. As FIG. 2 illustrates. It should be considered that the trigger of the spray gun 28 may actuate the motorized pump 32 allowing the colored substance to flow through the nozzle of the spray gun 28.

In other embodiment, the extension wands 30 may be metallic extension poles removably attachable to the nozzle of the spray gun 28. In a suitable embodiment, the extension wands 30 may be a plurality thereof with a plurality of lengths, thereby the extension wands allow the user to reach high, low places and recessed areas when painting, also it should be considered that the extension wands 30 may have different nozzle types to distribute the colored substance in a wide/narrow range.

In an exemplary embodiment, the flow of the colored substance may be regulated by means of the prime valve 36, wherein the prime valve 36 is a valve well known in the art operatively connected to the motorized pump 32 and mounted on an external side of the housing 38. As FIG. 4 illustrates. In a suitable variation, the prime valve may be part of the spray gun 28 allowing the flow of the colored substance to be regulated as the user may consider appropriate. In a preferred embodiment, the motorized pump 32 may be an electric pump powered by the battery 34, wherein the battery 34 may be a rechargeable battery well known in the prior art. It should be considered that the battery 34 may be removed from the housing to be charged or the housing 38 may include a port/wire to connect the battery to a power supply for charging.

Figure 3:
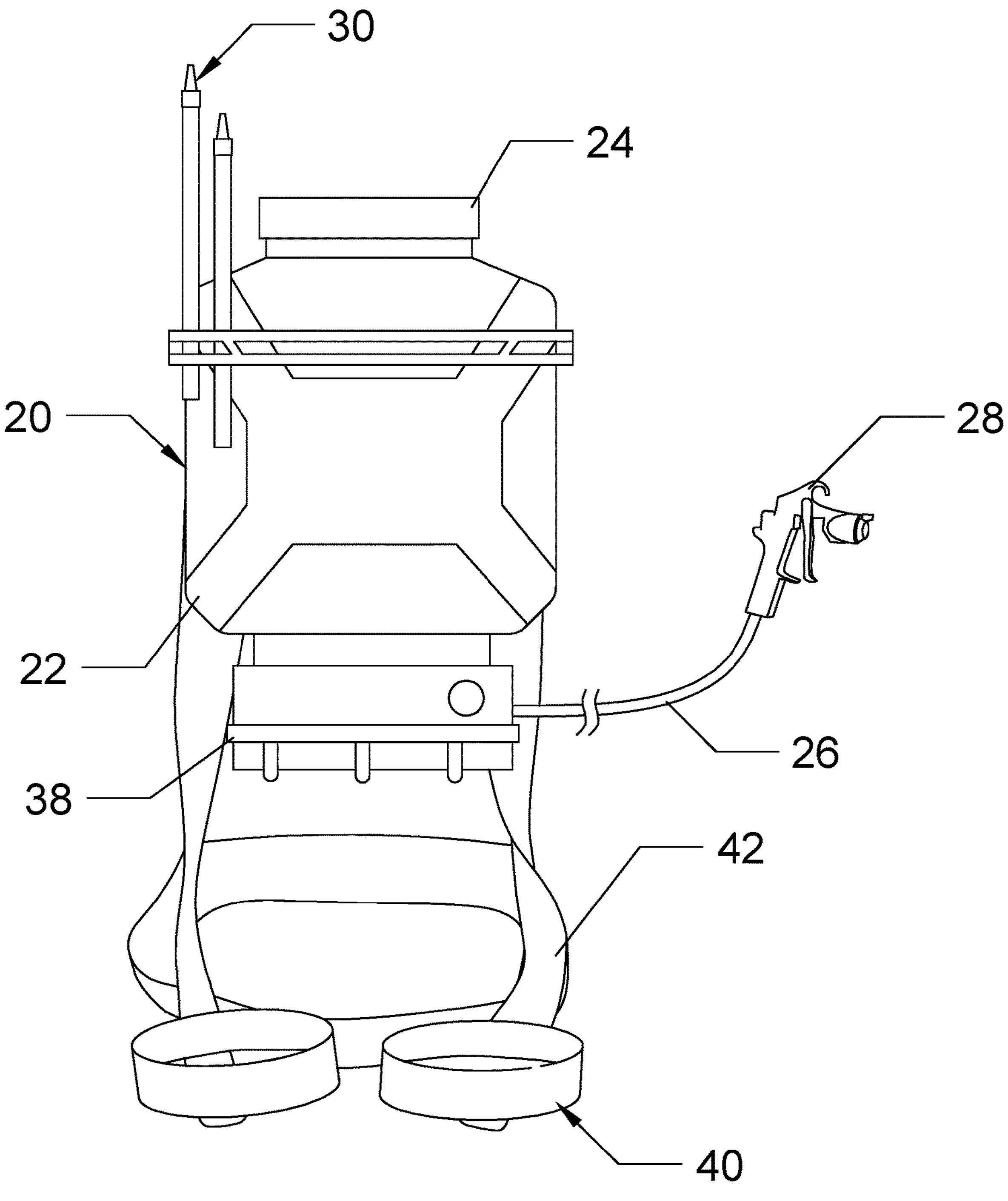
FIG. 3 illustrates a front view of the sprayer assembly 20, wherein extension wands are mounted on the container 22, thereby the user may attach each wand of the extension wands to the spray gun for high, lo, or recessed areas.

Harness assembly 40 includes a safety harness 42 and shoulder straps 44. In an exemplary embodiment, the safety harness 42 may be a system of restraints that prevent the wearer from falling, thereby the safety harness 42 allows the user to attach themselves to a stationary object by means of a safety line, wherein the safety harness 42 may be device well known in the prior art with shoulder straps 44 adapted with a padded portion to provide support while carrying the sprayer assembly 20. As FIG. 1 demonstrates. In a suitable embodiment, the shoulder straps 44 may include a padded portion adapted to be in contact with the user's shoulders. In a preferred embodiment, the sprayer assembly 20 may be attached to the dorsal of the safety harness 42, as best lustrated in FIG. 3, wherein the sprayer assembly 20 may include a metal frame to enhance the support while being carried on the user's back, thereby the sprayer assembly 20 may be attached and detached from the safety harness 42, allowing the user to provide a portable device when painting.

Support assembly 60 includes a top support 62, a top attaching portion **62*a*, a bottom support 64 and a bottom attaching portion 64*a*. In an exemplary embodiment, the top support 62 may be a structure made of a metal, hard plastic, aluminum, or any other suitable material, wherein the top support may have a circumference that surrounds the circumference of the container. As FIG. 1 represents. The to support includes in a rear side thereof a top attaching portion 62*a*, wherein the top attaching portion 62*a* may be a support removably attachable or fixed to the dorsal of the safety harness, as best depicted in FIG. 4, thereby the top attaching portion 62*a* provides a means of support when carrying the sprayer assembly 20. As FIG. 1 illustrates. In a preferred embodiment, the bottom support 64 may be a structural support configured to receive and support the housing 38, as FIG. 2 illustrates, wherein the bottom support 64 is made of a metal material, hard plastic, aluminum, or any other suitable material that supports the weight of the sprayer assembly 20. In a preferred embodiment, the bottom support 64 may be structurally connected to the top support 62, as FIG. 4 illustrates, wherein the bottom support 64 includes a bottom attaching support in a rear side thereof that is configured to be attachable and/or fixed to the belt of the safety harness 42 allowing the support assembly 40 to provide a support for the user when carrying the sprayer assembly 20. It should be considered that the extension wands may be removably attachable to the support assembly, wherein the top support 62** may include a support member to receive and hold the extension wands.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A back-carried paint sprayer, comprising:

a sprayer assembly including a container, a lid, a hose, a spray gun, extension wands, a motorized pump, a battery, a pressure control valve, and a housing; wherein the container is a receptacle with an opening in a top portion thereof where the lid is removably attachable, wherein a mesh screen filter is removably attached to the opening to prevent debris from entering inside the container; wherein said housing is attached to a bottom side of said container; wherein said housing encloses said battery and said motorized pump, said housing has a rectangular shape, said pressure control valve is mounted on a front face of said housing and is operatively connected to said motorized pump to regulate flow and pressure of a colored substance inside the container, said hose is attached to a lateral side of said housing; said hose is a flexible hose, wherein a distal end of the hose is operatively connected to said motorized pump, wherein a proximal end of said hose is connected to said spray gun;

a harness assembly having a safety harness and shoulder straps, wherein said safety harness is a wearable system coupled around a user's body, said shoulder straps are integrally formed with said safety harness to provide support when carrying said sprayer assembly on a user's back; and a support assembly including a top support with a top attaching portion, and a bottom support with a bottom attaching portion; wherein the top support and bottom support are structurally interconnected by a pair of vertical tubular members; wherein the vertical tubular members are parallel to each other and attached to rear sides of the top support and bottom support respectively, thereby forming a skeletal frame structure; the top support is a horizontally-oriented support structure having a circumferential configuration adapted to surround and engage a perimeter of the container; the top support includes longitudinal slots formed therethrough; the top attaching portion extends rearwardly from the top support as a planar mounting surface, wherein said planar mounting surface is substantially coplanar with the vertical tubular members connecting the top and bottom supports; the bottom support is a horizontally-oriented support platform having a smaller surface area than the top support; wherein the bottom support is dimensioned and configured to receive and support the housing; the bottom support comprises tubular members arranged in an open lattice structure, thereby forming gaps between the tubular members; wherein when the housing is seated upon the bottom support, the open lattice structure allows the pressure control valve mounted on an external side of the housing to remain exposed and accessible above an upper periphery of the bottom support, thereby permitting user adjustment of the pressure control valve during operation; wherein said top attaching portion attaches to a dorsal portion of said safety harness adjacent shoulder straps thereof; wherein said bottom attaching portion attaches to a belt portion of said safety harness at a waist level thereof; wherein said top attaching portion and said bottom attaching portion are vertically spaced apart along a height of said support assembly to provide a dual-point attachment system configured to distribute load between a user's shoulders and waist while preventing rotational movement of said sprayer assembly during use.

2. The back-carried paint sprayer of claim 1, wherein said container is made of plastic and/or metal material to protect said colored substance from the ambiance.

3. The back-carried paint sprayer of claim 1, wherein said spray gun has a trigger that actuates said motorized pump when pressed allowing said colored substance to flow through said hose and be sprayed through a nozzle of said spray gun.

4. The back-carried paint sprayer of claim 1, wherein said extension wands are metallic poles with a plurality of lengths thereof, wherein said extension wands are removably attachable to said nozzle of said spray gun.

5. The back-carried paint sprayer of claim 1, wherein said extension wands includes a nozzle in a distal end thereof to spray said colored substance in a liquid phase.

6. The back-carried paint sprayer of claim 1, wherein said motorized pump is an airless pump powered by means of said battery.

7. The back-carried paint sprayer of claim 1, wherein said battery is a rechargeable battery.

8. A back-carried paint sprayer, consisting of:

a sprayer assembly including a container, a lid, a hose, a spray gun, extension wands, a motorized pump, a battery, a pressure control valve, and a housing; wherein the container is a receptacle with an opening in a top portion thereof where the lid is removably attachable; wherein a mesh screen filter is removably attached to the opening to prevent debris from entering inside the container; wherein said housing is attached to a bottom side of said container; wherein said housing encloses said battery and said motorized pump, said housing has a rectangular shape, said pressure control valve is mounted on a front face of said housing and is operatively connected to said motorized pump to regulate flow and pressure of a colored substance inside the container, said hose is attached to a lateral side of said housing; said hose is a flexible hose, wherein a distal end of the hose is operatively connected to said motorized pump, wherein a proximal end of said hose is connected to said spray gun; wherein said spray gun has a trigger that actuates said motorized pump when pressed allowing said colored substance to flow through said hose and be sprayed through a nozzle of said spray gun; wherein each of said extension wands include a nozzle in a distal end thereof to spray said colored substance in a liquid phase; wherein said motorized pump is an airless pump powered by said battery;

a harness assembly having a safety harness and shoulder straps, wherein said safety harness is a wearable system coupled around a user's body, said shoulder straps are integrally formed with said safety harness to provide support when carrying said sprayer assembly on a user's back; and a support assembly including a top support with a top attaching portion, and a bottom support with a bottom attaching portion; wherein the top support and bottom support are structurally interconnected by a pair of vertical tubular members; wherein the vertical tubular members are parallel to each other and attached to rear sides of the top support and bottom support respectively, thereby forming a skeletal frame structure; the top support is a horizontally-oriented support structure having a circumferential configuration adapted to surround and engage a perimeter of the container; the top support includes longitudinal slots formed therethrough; the top attaching portion extends rearwardly from the top support as a planar mounting surface, wherein said planar mounting surface is substantially coplanar with the vertical tubular members connecting the top and bottom supports; the bottom support is a horizontally-oriented support platform having a smaller surface area than the top support; wherein the bottom support is dimensioned and configured to receive and support the housing; the bottom support comprises tubular members arranged in an open lattice structure, thereby forming gaps between the tubular members; wherein when the housing is seated upon the bottom support, the open lattice structure allows the pressure control valve mounted on an external side of the housing to remain exposed and accessible above an upper periphery of the bottom support, thereby permitting user adjustment of the pressure control valve during operation; wherein said top attaching portion attaches to a dorsal portion of said safety harness adjacent shoulder straps thereof; wherein said bottom attaching portion attaches to a belt portion of said safety harness at a waist level thereof; wherein said top attaching portion and said bottom attaching portion are vertically spaced apart along a height of said support assembly to provide a dual-point attachment system configured to distribute load between a user's shoulders and waist while preventing rotational movement of said sprayer assembly during use.

* * * * *